(12) United States Patent
Moore et al.

(10) Patent No.: US 11,128,525 B2
(45) Date of Patent: Sep. 21, 2021

(54) ADAPTIVE CAPACITY MANAGEMENT OF CONNECTIONS ASSOCIATED WITH A SERVICE

(71) Applicant: Comcast Cable Communications, LLC, Philadelphia, PA (US)

(72) Inventors: Jonathan Moore, Philadelphia, PA (US); Jason Press, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/145,915

(22) Filed: Sep. 28, 2018

(65) Prior Publication Data

US 2019/0104015 A1   Apr. 4, 2019

Related U.S. Application Data

(60) Provisional application No. 62/566,086, filed on Sep. 29, 2017.

(51) Int. Cl.
*G06F 15/173* (2006.01)
*H04L 12/24* (2006.01)
*H04L 29/08* (2006.01)
*H04L 12/26* (2006.01)

(52) U.S. Cl.
CPC .......... *H04L 41/0803* (2013.01); *H04L 41/14* (2013.01); *H04L 43/16* (2013.01); *H04L 67/1085* (2013.01); *H04L 67/14* (2013.01); *H04L 67/141* (2013.01)

(58) Field of Classification Search
CPC ............. H04L 67/1085; H04L 67/1055; H04L 67/141; H04L 41/0803; H04L 67/14; H04L 43/16; H04L 67/32; H04L 41/14
USPC ................................ 709/224, 226, 227, 228
See application file for complete search history.

(56) References Cited

U.S. PATENT DOCUMENTS

| | | | | |
|---|---|---|---|---|
| 7,484,011 | B1 * | 1/2009 | Agasaveeran | .... H04L 29/12377 709/250 |
| 8,606,930 | B1 * | 12/2013 | Jain | ........................ H04L 47/522 709/227 |
| 2003/0079031 | A1 * | 4/2003 | Nagano | ................. H04L 63/104 709/229 |
| 2003/0081595 | A1 * | 5/2003 | Nomura | ................ H04L 47/825 370/353 |
| 2007/0036120 | A1 * | 2/2007 | Zhang | ................... H04M 15/00 370/338 |
| 2011/0258322 | A1 * | 10/2011 | Luzzatti | ................. H04L 65/80 709/226 |
| 2013/0237224 | A1 * | 9/2013 | Fujino | ................... H04W 76/36 455/435.1 |

(Continued)

OTHER PUBLICATIONS

Translation of CN106909463A published on Jun. 30, 2017. (Year: 2017).*

*Primary Examiner* — Johnny B Aguiar
(74) *Attorney, Agent, or Firm* — Banner & Witcoff, Ltd.

(57) ABSTRACT

Systems, apparatuses, and methods are described for managing concurrent requests from clients for services. Client computing devices may be permitted to use available capacity beyond their assigned quotas. When backpressure exists, connections with a client exceeding a proportion of excess capacity may be closed before connections with a client not exceeding a proportion of excess capacity.

49 Claims, 8 Drawing Sheets

(56) References Cited

U.S. PATENT DOCUMENTS

| | | | | |
|---|---|---|---|---|
| 2014/0192670 A1* | 7/2014 | Subramanian | .......... | H04L 63/10 |
| | | | | 370/252 |
| 2014/0229525 A1* | 8/2014 | Crawford | .......... | H04L 29/06319 |
| | | | | 709/203 |
| 2015/0326643 A1* | 11/2015 | Campbell | ............... | H04L 67/42 |
| | | | | 709/219 |
| 2017/0019750 A1* | 1/2017 | Palanisamy | ............. | H04W 4/70 |
| 2017/0374098 A1* | 12/2017 | Kish | ................... | H04L 43/0876 |

\* cited by examiner

ADAPTIVE CAPACITY MANAGEMENT OF CONNECTIONS ASSOCIATED WITH A SERVICE

RELATED APPLICATION INFORMATION

This application claims priority to U.S. Provisional Application Ser. No. 62/566,086, filed Sep. 29, 2017, the entire contents of which are expressly incorporated herein by reference.

BACKGROUND

Application programming interface (API) gateways may serve as intermediaries between clients and systems that provide services to those clients. Such services may be requested and delivered via networks using the Internet Protocol communication protocol (IP) and may include, without limitation, video-on-demand, voice over Internet Protocol (VoIP) telephony, and other services. The API gateways may provide authentication and capacity management. With respect to capacity management, API gateways generally use a rate-limiting technique to manage client requests to ensure each client does not exceed its allotted quantity of connections to a given service. In the rate-limiting approach, a client may be limited in how many requests the client may make to a service during a time interval (e.g., 50 requests per second per client). This approach may require that the API gateway track the quantity of requests made during the time interval and may become computationally complex.

As an API gateway or service becomes overloaded, clients may continue to make new requests following refused or timed-out connection requests. Further, as service providers add capacity, API gateways may need updating to increase the limit per client; otherwise, the API gateways may unnecessarily be limiting client connections to a service. Denials of service to such clients may incorrectly indicate that additional capacity is needed.

SUMMARY

The following summary presents a simplified summary of certain features. The summary is not an extensive overview and is not intended to identify key or critical elements.

Systems, apparatuses, and methods are described for handling concurrent requests for service from client computing devices. Quotas may be used to limit the quantity of concurrent connections a client computing device may have with regard to one or more specific services. The quotas may be flexible based on one or more of: an overall available capacity of the service, the extent a given client computing device has exceeded its quota, and the extent other client computing devices have exceeded their respective quotas. A client computing device that has exceeded its quota may be permitted to further increase its quantity of connections to a service that has additional capacity. Based on a determination that a service is exhibiting backpressure, connections from client computing devices that have exceeded their connection quota may be culled.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

DETAILED DESCRIPTION

Figure 1:
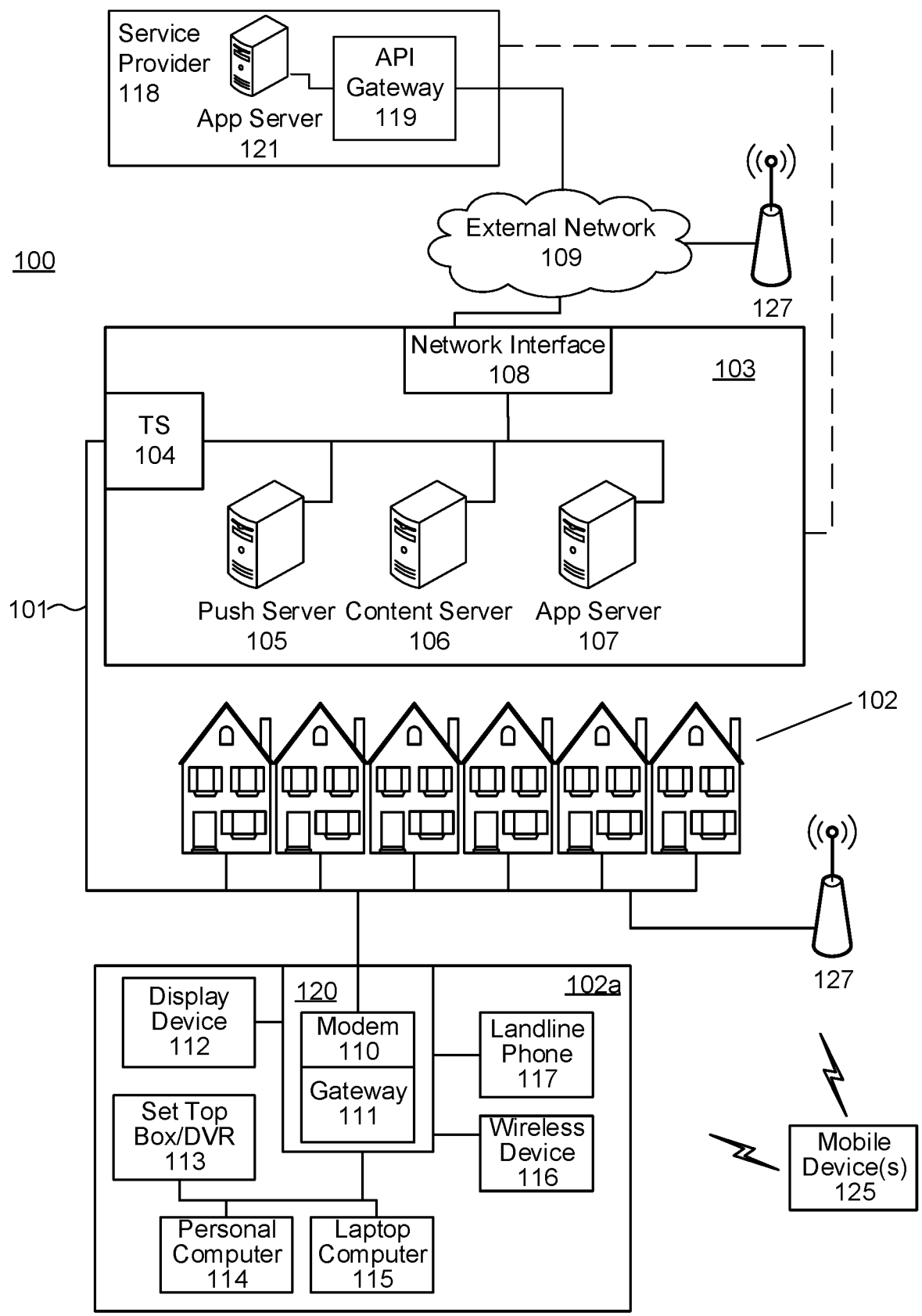
FIG. 1 shows an example communication network.

The accompanying drawings, which form a part hereof, show examples of the disclosure. It is to be understood that the examples shown in the drawings and/or discussed herein are non-exclusive and that there are other examples of how the disclosure may be practiced.

Systems, apparatuses, and methods are described for handling concurrent requests for service from client computing devices. Temporary borrowing of excess capacity in connections between clients and services may be permitted to allow adaptive management of the services' capacity. Adaptation may be based on one or more services exhibiting backpressure in servicing of existing connections or in establishing new connections. Backpressure may be an indication that a requested service is near, at, or over capacity. Additionally or alternatively, backpressure may be an indication that capacity has been reduced (e.g., during maintenance intervals or during equipment failures). Backpressure may comprise one or more of specific messages sent from a service (e.g., a Hypertext Transfer Protocol (HTTP) 429 ("HTTP 429") error code, an "HTTP 502" error code, an "HTTP 503" error code, or a specific denial of a connection request) or annotations attached to messages from the service (e.g., an HTTP "Warning" header). Additionally or alternatively, backpressure may comprise a time delay between sending a message to a service and receiving a response from the service (e.g., a socket/connect timeout for messages sent to the service). Additionally or alternatively, backpressure may comprise a lack of response to a message sent to the service. One or more services may be managed and/or provided by one or more entities. The one or more entities may separately detect backpressure based their interactions with the service.

Figure 2:
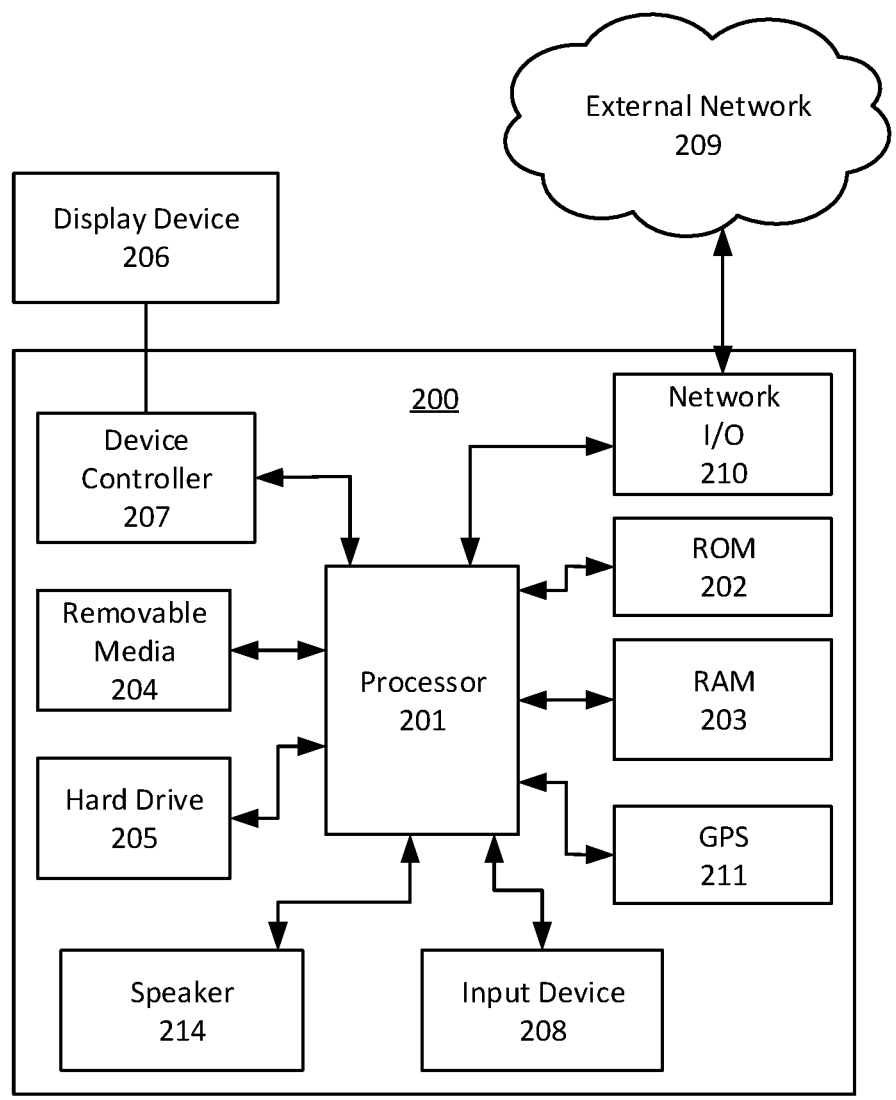
FIG. 2 shows hardware elements of a computing device.

Non-limiting examples of computing devices and/or network architectures that may be used in implementing and/or otherwise providing various concepts of the disclosure are shown FIGS. 1 and 2.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Also, the term "network" as used herein and depicted in the drawings refers not only to systems in which remote storage devices are coupled together via one or more communication links, but may also include stand-alone devices that may be coupled, from time to time, to such systems and/or that have storage capability. Consequently, the term "network" may comprise not only a "physical network" but also a "content network," which is comprised of the data—attributable to a single entity—which resides across all physical networks.

FIG. 1 shows an example communication network 100 in which features described herein may be implemented. The communication network 100 may comprise one or more information distribution networks of any type, such as, without limitation, a telephone network, a wireless network (e.g., a Long-Term Evolution (LTE) network, a 5G network, a Wi-Fi® (e.g., Institute of Electrical and Electronics Engineers (IEEE) 802.11) network, a Worldwide Interoperability for Microwave Access (WiMAX) network, a satellite network, and/or any other network for wireless communication), an optical fiber network, a coaxial cable network, and/or a hybrid fiber/coax distribution network. The communication network 100 may use a series of interconnected communication links 101 (e.g., coaxial cables, optical fibers, wireless links, etc.) to connect multiple premises 102 (e.g., businesses, homes, consumer dwellings, train stations, airports, etc.) to a local office 103 (e.g., a headend). The local office 103 may send downstream information signals and receive upstream information signals via the communication links 101. Each of the premises 102 may comprise devices, described below, to receive, send, and/or otherwise process those signals and information contained therein.

The communication links 101 may originate from the local office 103 and may comprise components not illustrated, such as splitters, filters, amplifiers, etc., to help convey signals clearly. The communication links 101 may be coupled to one or more wireless access points 127 configured to communicate with one or more mobile devices 125 via one or more wireless networks. The mobile devices 125 may comprise smart phones, tablets or laptop computers with wireless transceivers, tablets or laptop computers communicatively coupled to other devices with wireless transceivers, and/or any other type of device configured to communicate via a wireless network.

The local office 103 may comprise an interface 104, such as a termination system (TS). The interface 104 may comprise a modem termination system (CMTS) and/or other computing device(s) configured to send information downstream to, and to receive information upstream from, devices communicating with the local office 103 via the communications links 101. The interface 104 may be configured to manage communications among those devices, to manage communications between those devices and backend devices such as servers 105-107, and/or to manage communications between those devices and one or more external networks 109. The local office 103 may comprise one or more network interfaces 108 that comprise circuitry needed to communicate via the external networks 109. The external networks 109 may comprise networks of Internet devices, telephone networks, wireless networks, wireless networks, fiber optic networks, and/or any other desired network. The local office 103 may also or alternatively communicate with the mobile devices 125 via the interface 108 and one or more of the external networks 109, e.g., via one or more of the wireless access points 127.

The push notification server 105 may be configured to generate push notifications to deliver information to devices in the premises 102 and/or to the mobile devices 125. The content server 106 may be configured to provide content to devices in the premises 102 and/or to the mobile devices 125. This content may comprise, for example, video, audio, text, web pages, images, files, etc. The content server 106 (or, alternatively, an authentication server) may comprise software to validate user identities and entitlements, to locate and retrieve requested content, and/or to initiate delivery (e.g., streaming) of the content. The application server 107 may be configured to offer any desired service. For example, an application server may be responsible for collecting, and generating a download of, information for electronic program guide listings. Another application server may be responsible for monitoring user viewing habits and collecting information from that monitoring for use in selecting advertisements. Yet another application server may be responsible for formatting and inserting advertisements in a video stream being transmitted to devices in the premises 102 and/or to the mobile devices 125. The local office 103 may comprise additional servers, additional push, content, and/or application servers, and/or other types of servers. Although shown separately, the push server 105, the content server 106, the application server 107, and/or other server(s) may be combined. The servers 105, 106, and 107, and/or other servers, may be computing devices and may comprise memory storing data and also storing computer executable instructions that, when executed by one or more processors, cause the server(s) to perform steps described herein.

An example premises 102a may comprise an interface 120. The interface 120 may comprise circuitry used to communicate via the communication links 101. The interface 120 may comprise a modem 110, which may comprise transmitters and receivers used to communicate via the communication links 101 with the local office 103. The modem 110 may comprise, for example, a coaxial cable modem (for coaxial cable lines of the communication links 101), a fiber interface node (for fiber optic lines of the communication links 101), a twisted-pair telephone modem, a wireless transceiver, and/or any other desired modem device. One modem is shown in FIG. 1, but a plurality of modems operating in parallel may be implemented within the interface 120. The interface 120 may comprise a gateway 111. The modem 110 may be connected to, or be a part of, the gateway 111. The gateway 111 may be a computing device that communicates with the modem(s) 110 to allow one or more other devices in the premises 102a to communicate with the local office 103 and/or with other devices beyond the local office 103 (e.g., via the local office 103 and the external network(s) 109). The gateway 111 may comprise a set-top box (STB), digital video recorder (DVR), a digital transport adapter (DTA), a computer server, and/or any other desired computing device.

The gateway 111 may also comprise one or more local network interfaces to communicate, via one or more local networks, with devices in the premises 102a. Such devices may comprise, e.g., display devices 112 (e.g., televisions), STBs or DVRs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA)), landline phones 117 (e.g., Voice over Internet Protocol—VoIP phones), and any other desired devices. Example types of local networks comprise Multimedia over Coax Alliance (MoCA) networks, Ethernet networks, networks communicating via Universal Serial Bus (USB) interfaces, wireless networks (e.g., IEEE 802.11, IEEE 802.15, Bluetooth), networks communicating via in-premises power lines, and others. The lines connecting the interface 120 with the other devices in the premises 102a may represent wired or wireless connections, as may be appropriate for the type of local network used. One or more of the devices at the premises 102a may be configured to provide wireless communications channels (e.g., IEEE 802.11 channels) to communicate with one or more of the mobile devices 125, which may be on- or off-premises.

The mobile devices 125, one or more of the devices in the premises 102*a*, and/or other devices may receive, store, output, and/or otherwise use assets. An asset may comprise a video, a game, one or more images, software, audio, text, webpage(s), and/or other content.

Further, one or more service providers 118 may be connected to the external network 109. The service provider 118, and a service provider generally, may comprise one or more computing devices and/or one or more networks of computing devices configured to provide services to one or more clients. The service provider 118 may be managed, controlled, and/or otherwise operated by one or more entities, which entity(ies) may be same as or different from one or more entities that manage, control, and/or otherwise operate network(s) through which the service provider 118 may be accessed. The service provider 118 may provide video-on-demand, voice over Internet Protocol (VoIP) telephony, and other such services. The service provider 118 may comprise one or more API gateways 119 connected to one or more app servers 121 to provide one or more of those services or other services as desired.

In FIG. 1, the service provider 118 is shown with an API gateway 119 co-located with the app server 121. Additionally or alternatively, the API gateway 119 (or another API gateway 119) may be located remote from the app server 121. In addition, while the service provider 118 is shown accessible by the local office 103 via the external network 109, the service provider 118 may be directly accessible by the local office 103 without communicating via the external network 109 (as shown by a dashed line connecting the local office 103 to the service provider 118). One or more API gateways may also or alternatively be provided in connection with one or more of the servers 105-107 of the local office 103.

FIG. 2 shows hardware elements of a computing device 200 that may be used to implement any of the computing devices shown in FIG. 1 (e.g., the mobile devices 125, any of the devices shown in the premises 102*a*, any of the devices shown in the local office 103, any of the wireless access points 127, any devices with the external network 109, any of the devices associated with the service provider 118) and any other computing devices discussed herein (e.g., Transmission Control Protocol (TCP) load balancers and HTTP Proxies). The computing device 200 may comprise one or more processors 201, which may execute instructions of a computer program to perform any of the functions described herein. The instructions may be stored in a read-only memory (ROM) 202, random access memory (RAM) 203, removable media 204 (e.g., a USB drive, a compact disk (CD), a digital versatile disk (DVD)), and/or in any other type of computer-readable medium or memory. Instructions may also be stored in an attached (or internal) hard drive 205 or other types of storage media. The computing device 200 may comprise one or more output devices, such as a display device 206 (e.g., an external television and/or other external or internal display device) and a speaker 214, and may comprise one or more output device controllers 207, such as a video processor. One or more user input devices 208 may comprise a remote control, a keyboard, a mouse, a touch screen (which may be integrated with the display device 206), a microphone, etc. The computing device 200 may also comprise one or more network interfaces, such as a network input/output (I/O) interface 210 (e.g., a network card) to communicate with an external network 209. The network I/O interface 210 may be a wired interface (e.g., electrical, RF (via coax), optical (via fiber)), a wireless interface, or a combination of the two. The network I/O interface 210 may comprise a modem configured to communicate via the external network 209. The external network 209 may comprise the communication links 101 discussed above, the external network 109, an in-home network, a network provider's wireless, coaxial, fiber, or hybrid fiber/coaxial distribution system (e.g., a DOCSIS network), or any other desired network. The computing device 200 may comprise a location-detecting device, such as a global positioning system (GPS) microprocessor 211, which may be configured to receive and process global positioning signals and determine, with possible assistance from an external server and antenna, a geographic position of the computing device 200.

Although FIG. 2 shows an example hardware configuration, one or more of the elements of the computing device 200 may be implemented as software or a combination of hardware and software. Modifications may be made to add, remove, combine, divide, etc. components of the computing device 200. Additionally, the elements shown in FIG. 2 may be implemented using basic computing devices and components that have been configured to perform operations such as are described herein. For example, a memory of the computing device 200 may store computer-executable instructions that, when executed by the processor 201 and/or one or more other processors of the computing device 200, cause the computing device 200 to perform one, some, or all of the operations described herein. Such memory and processor(s) may also or alternatively be implemented through one or more Integrated Circuits (ICs). An IC may be, for example, a microprocessor that accesses programming instructions or other data stored in a ROM and/or hardwired into the IC. For example, an IC may comprise an Application Specific Integrated Circuit (ASIC) having gates and/or other logic dedicated to the calculations and other operations described herein. An IC may perform some operations based on execution of programming instructions read from ROM or RAM, with other operations hardwired into gates or other logic. Further, an IC may be configured to output image data to a display buffer.

Computer-usable data and/or computer-executable instructions, such as in one or more program modules, may be executed by one or more computers or other computing devices to perform, or cause performance of, any or all of the operations disclosed herein. Generally, program modules comprise routines, programs, objects, components, data structures, etc. that perform particular tasks or implement particular abstract data types when executed by a processor in a computer or other data processing device. The computer executable instructions and/or computer-usable data may be stored on one or more computer readable media such as a hard disk, optical disk, removable storage media, solid state memory, RAM, etc. The functionality of the program modules may be combined or distributed as desired. In addition, the functionality may be embodied in whole or in part in firmware or hardware equivalents such as integrated circuits, field programmable gate arrays (FPGA), and the like. Particular data structures may be used to more effectively implement one or more concepts of the disclosure, and such data structures are contemplated within the scope of computer executable instructions and computer-usable data.

Figure 3:
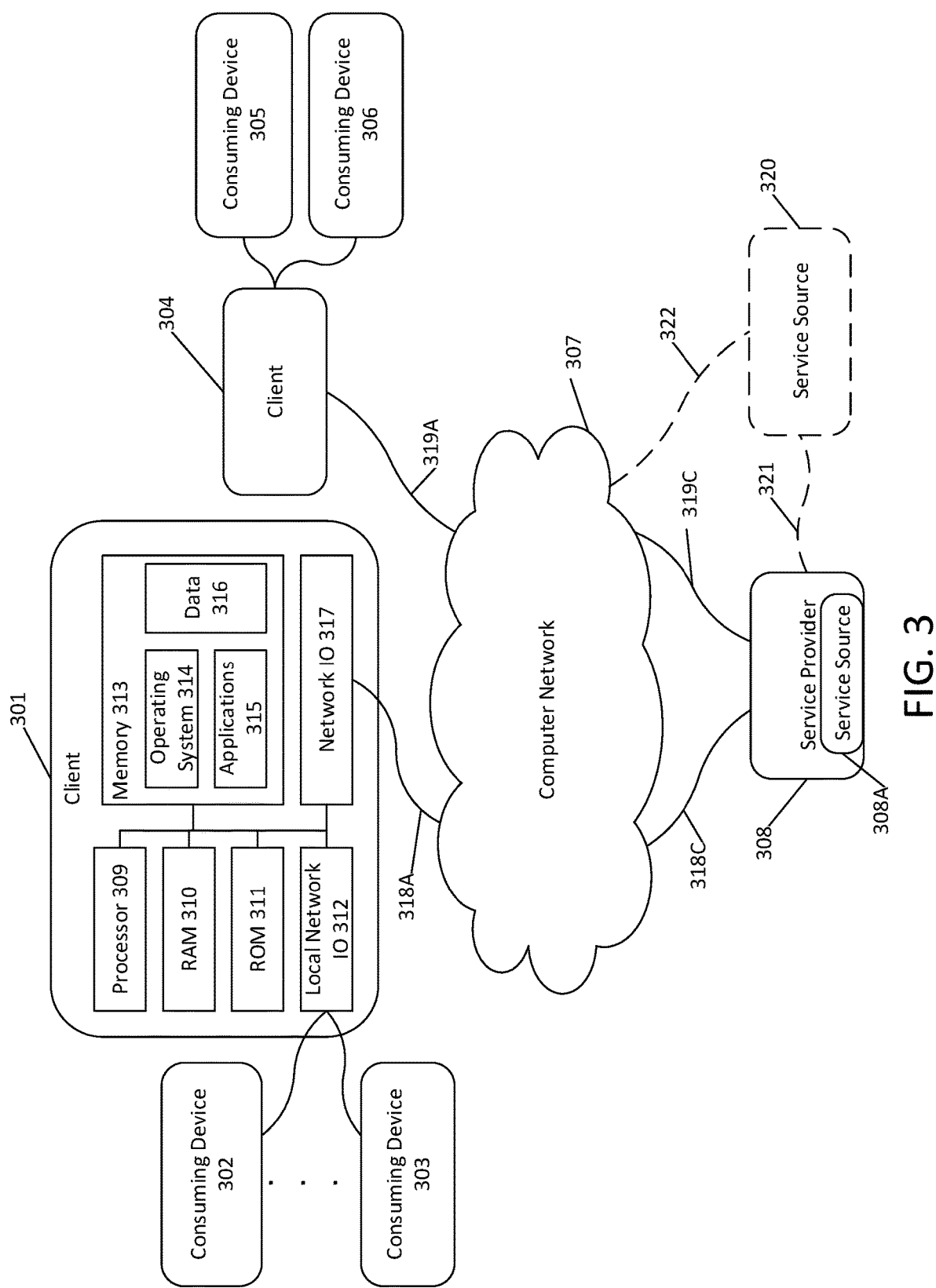
FIG. 3 shows an example of connections between clients and services.

FIG. 3 shows an example of connections between clients and one or more services. A client 301 may be a computing device and may provide access for one or more consuming devices (e.g., consuming devices 302 and 303) to a computer network 307. The computer network 307 provide access to one or more of service sources 308A or 320. Each of the service sources 308A and 320 shown in FIG. 3 may comprise one or more servers and/or other computing devices configured to output content and/or other data associated with a service. Services may comprise, but are not limited to, providing video, voice and other communications, transactions, internet browsing, home automation, songs, text, and other various computing-related interactions.

Consuming devices may provide content received from the services to one or more end users. A client 304 may provide access for one or more other consuming devices (e.g., consuming devices 305 and 306) to the computer network 307. The consuming devices 302, 303, 305, and 306 may comprise but are not limited to the following examples: set top boxes, cell phones, television/cable receivers with integrated processing hardware, tablets, and/or game consoles.

The clients 301 and 304 may connect to a service provider 308 via the computer network 307. The service provider 308 may comprise a system of one or more servers and/or other computing devices configured content provide content. A service provider may comprise one or more servers and/or other computing devices configured that provide services to one or more computing devices associated with a client or a client's premises. The service provider 308 may be the sole provider of one or more services associated with the service source 308A or may be one of multiple providers of one or more services associated with the service source 320. The service provider 308 may be connected via a communication link 321 to the service source 320. The service source 320 may be available via a communication link 322 to the computer network 307 and/or other service providers. As mentioned above, the service source 308A and the service source 320 may comprise one or more servers as described in FIG. 1. The servers may be rack-mounted servers with similar rack-mounted data storage systems (e.g., disks, solid state memories, and/or other storage systems).

The client 301 may comprise a processor 309 with a RAM 310 and a ROM 311, where the processor 309 executes instructions stored in a memory 313. The memory 313 may store an operating system 314, applications 315, and data 316. The client 301 may comprise a network input/output interface 317 that may connect to the computer network 307 via a communication link 318A. The client 301 may be connected via the computer network 307 and a communication link 318C to the service provider 308. Additionally or alternatively, the client 301 may be connected via the computer network 307 and the communication link 322 to the service source 320. The communication links may be IP-based, Asynchronous Transfer Mode-based (ATM)-based, or any other network infrastructure link. The client 301 may be connectable to one or more of the consuming device 302 and the consuming device 303 via a local network input/output interface 312. The client 304 may similarly connect to the computer network 307 via a communication link 319A, to the service provider 308 via the communication link 318C and/or 319C, and to the service source 320 via the communication link 322. The client 301 may be a STB or DVR such as the STB or DVR 113 of FIG. 1. The service provider 308 may be a service provider such as the service provider 118 of FIG. 1.

The client computing devices may send connection requests to the service providers. The connection requests may be TCP/IP requests and/or requests using other protocols. The connection requests may be to receive concurrent services. The service providers may operate in at least two modes with respect to handling new connection requests. In a first mode, the service provider may generally accept new connection requests. In a second mode, the service provider, having detected back pressure from a service source, may be generally refusing new connection requests. The first mode may be referred to as a probe mode and the second mode may be referred to as a contract mode. The service source may provide its status to the service provider and may include the service source's excess capacity. However, the service provider may not receive the service source's status or the service source's excess capacity. Based on limited capacity at the service source or not receiving the service source's status, the service provider may adjust how the service provider handles new connection requests from clients. Based on limited capacity at the service source or not receiving the service source's status, the service provider may generate and/or modify messages to be sent to the clients. Additionally or alternatively, a third mode may comprise a hold mode during which new connections may be added at a slower rate (slower than in the probe mode) when nearing capacity of the concurrent connections of service sources.

The service provider 308 may provide services to the client 301. The provided services may comprise one or more services associated with the service source 308A and/or the service source 320. The service provider 308 may monitor a total quantity of connections from itself to the service source (either the service source 308A associated with by the service provider 308 or the service source 320 that may be external to the service provider 308). Alternatively or additionally, the service source 320 may monitor a total quantity of connections to itself from the service provider 308, from other service providers, and/or from the computer network 307. Further, the service provider 308 may monitor and control the quantity of connections it permits from its clients to the service source 320.

In the case of the service source 308A being solely accessible through the service provider 308, the total quantity of connections permitted from clients to the service source 308A may approximate a total current connection capacity of the service source 308A. Where the service source 320 may be only accepting connections from the service provider 308, the total quantity of connections permitted from clients to the service source 320 may approximate the total current connection capacity of the service source 320. However, based on possible network constraints, the service provider 308 may not, in fact, know the total current connection capacity of the service source 308A or the service source 320. Sometimes, the service provider 308 may only be aware of the existence of backpressure received from the service source 308A or the service source 320. Based on whether or not backpressure has been received from a service source (e.g., one or more of the service source 308A or the service source 320), the service provider 308 may permit new connection requests and/or may cull existing connections.

The clients may be assigned quotas of concurrent connections to the service source 308A or the service source 320 to permit the service provider 308 to monitor and/or control the connections to the service source. The quotas may be fixed or variable based on existing conditions of a service source. Where the quotas are dynamic to possibly account for variable network conditions, a client's quota may be referred to as the client's configured proportion of a total quantity of connections to a service source. Additionally or alternatively, the client's configured proportion may be used to help allocate excess capacity of the service source. Where a client has reached its configured proportion and excess capacity exists (e.g., by way of no back pressure having been detected), the client may be assigned a portion of that excess capacity based on its proportion of the total capacity of the service source (e.g., where a client has been assigned 10% of the total capacity of a service source and has reached its 10% allocation, the client may be assigned a 10% portion of the excess capacity). Additionally or alternatively, the proportion of total capacity and/or proportion of excess capacity may differ between clients based on service-level requirements or other constraints. The proportion of total capacity for two or more clients may range from less than 1% to greater than 50% as desired. A computation of the proportion of excess capacity to be allotted may be performed by the service provider, by the service source, and/or by other entities including, but not limited to, load balancers and proxies. For purposes of explanation, the determination of the quotas and/or proportions of excess capacity are described with respect to the service provider but are understood to be able to be determined and used for management via other entities.

Backpressure may exist where the quantity of connections permitted by the service provider 308 and the total connection capacity to the service source (308A or 320) is below the total of all client quotas. This backpressure may occur based on the service source experiencing operational problems. Based on these operational problems, there may be no excess capacity where the service source's total current connection capacity drops below the quantity of total current connections to the service source. The total current connection capacity may be a dynamic value and not a fixed value.

Figure 4:
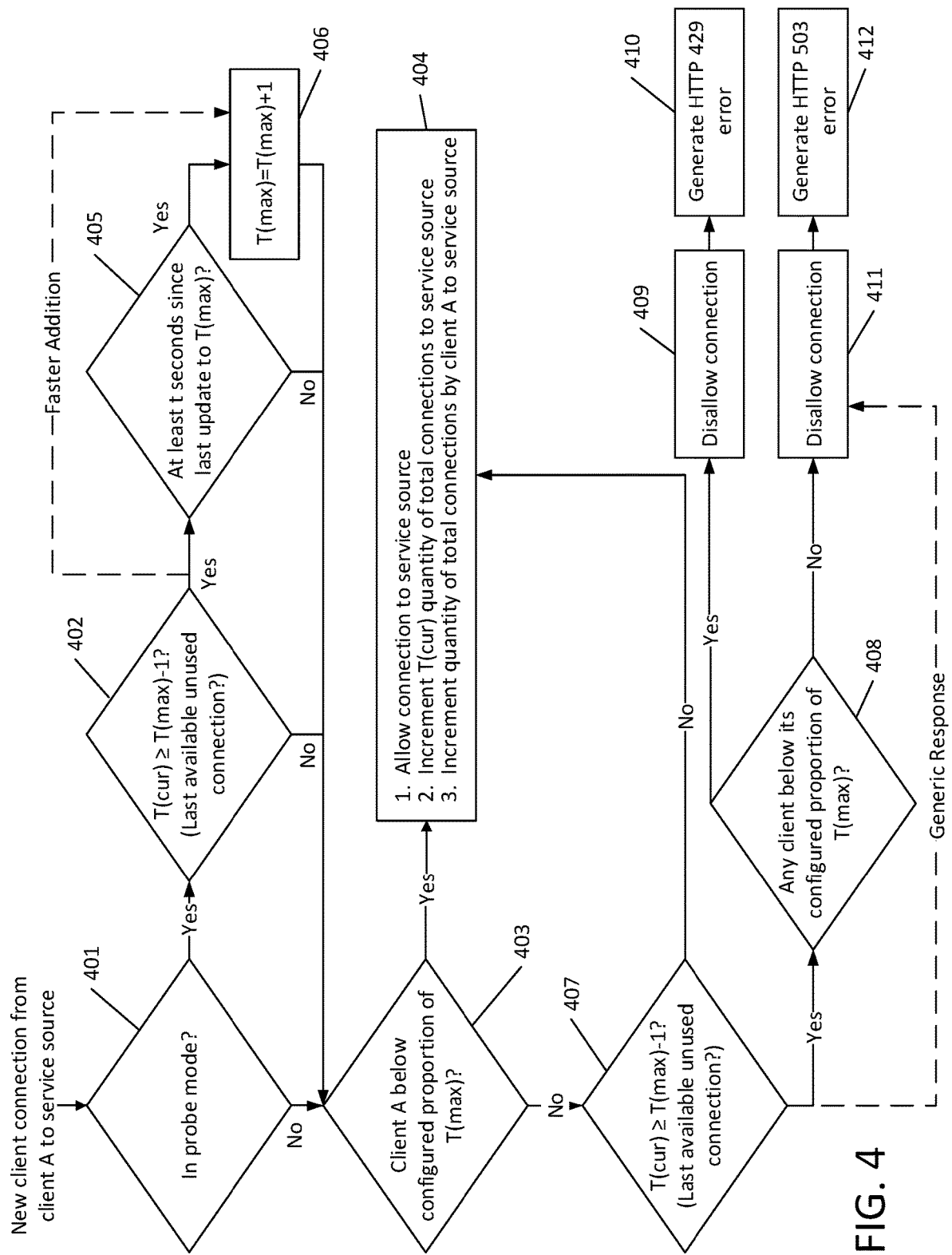
FIG. 4 is flow chart showing an example of handling new connection requests from a client.

FIG. 4 is flow chart showing an example of steps for handling new connection requests from a client. The steps performed in FIG. 4 are described in relation to the service provider 308 of FIG. 3. The steps may additionally or alternatively be performed by other server providers, other servers, or by service sources themselves.

The service provider may operate in various modes to manage the increase and decrease in the quantity of connections from the service provider to the service source. The modes may comprise at least one of the probe mode and the contract mode. In the probe mode, a service provider may be receiving connection requests from clients and permitting connections to a service source. In the contract mode, the service provider may be reducing the quantity of connections to the service source. Reducing the quantity of connections may include but is not limited to setting a target quantity of connections from the service provider to the service source to a value less than the current quantity of connections from the service provider to the service source. This may cause new connections to be rejected and some current connections to be terminated until the quantity of current connections reaches or is below the reduced target quantity of connections. The modes may also comprise the hold mode. In the hold mode, the service provider may be adding connections at a slower rate (slower than in the probe mode) when nearing capacity of the concurrent connections of service sources.

The clients may be initially assigned a quota relating to a quantity of concurrent connections each client may have to a service source. The quota may be determined in various ways including, but not limited to, at least one of the following: dividing a quantity of total connections of a service provider for a given service source by a quantity of clients connectable to that service source; dividing the quantity of total connections of the service provider by a fraction (less than 1) of the quantity of clients connectable to that service source; through experience of the quantity of clients who have attempted to connect to that service source in the past; or through agreements for minimum quantity of connections. The quota may be implemented by the service provider hosting or providing access to the service source and/or may be performed by servers of other entities (e.g., the local office 103 of FIG. 1) to which the clients are connected via one or more of the communication links 101.

The service provider may keep an account of the quantity of simultaneous TCP/IP connections each client has to a service source as well as an account of the total quantity of simultaneous connections across all clients to that service source. Additionally or alternatively, these two accounts may be maintained by one or more load balancers and/or proxies between the clients and the service sources. The determinations may be made in the service provider or in another entity (e.g., a load balancer or proxy) that directly or indirectly receives mode information from the service source. Examples of load balancers that may be used comprise but are not limited to the open source HAProxy and the open source NGINX HTTP and reverse proxy server.

In the example of FIG. 4, a service provider may be handling new connection requests from a client A for a service source. T(cur) may represent the current total quantity of active connections between the service provider and a service source associated with the requested services. T(max) may represent a target maximum quantity of connections the service provider seeks to allow to the service source. Based on backpressure or the lack of backpressure from the service source, T(max) may change to permit an increase or decrease in the quantity of connections to the service source.

The rate of change of T(max) may have a variety of forms including an increasing rate being the same as a decreasing rate. Additionally or alternatively, the rates may vary as an additive-increase/multiplicative-decrease (AIMD) process associated with TCP congestion control. With AIMD, T(max) increases by adding a value (e.g., a value of 1) and decreases by multiplying T(max) with a value less than 1 (e.g., a value p where p=0.75).

Figure 5A:
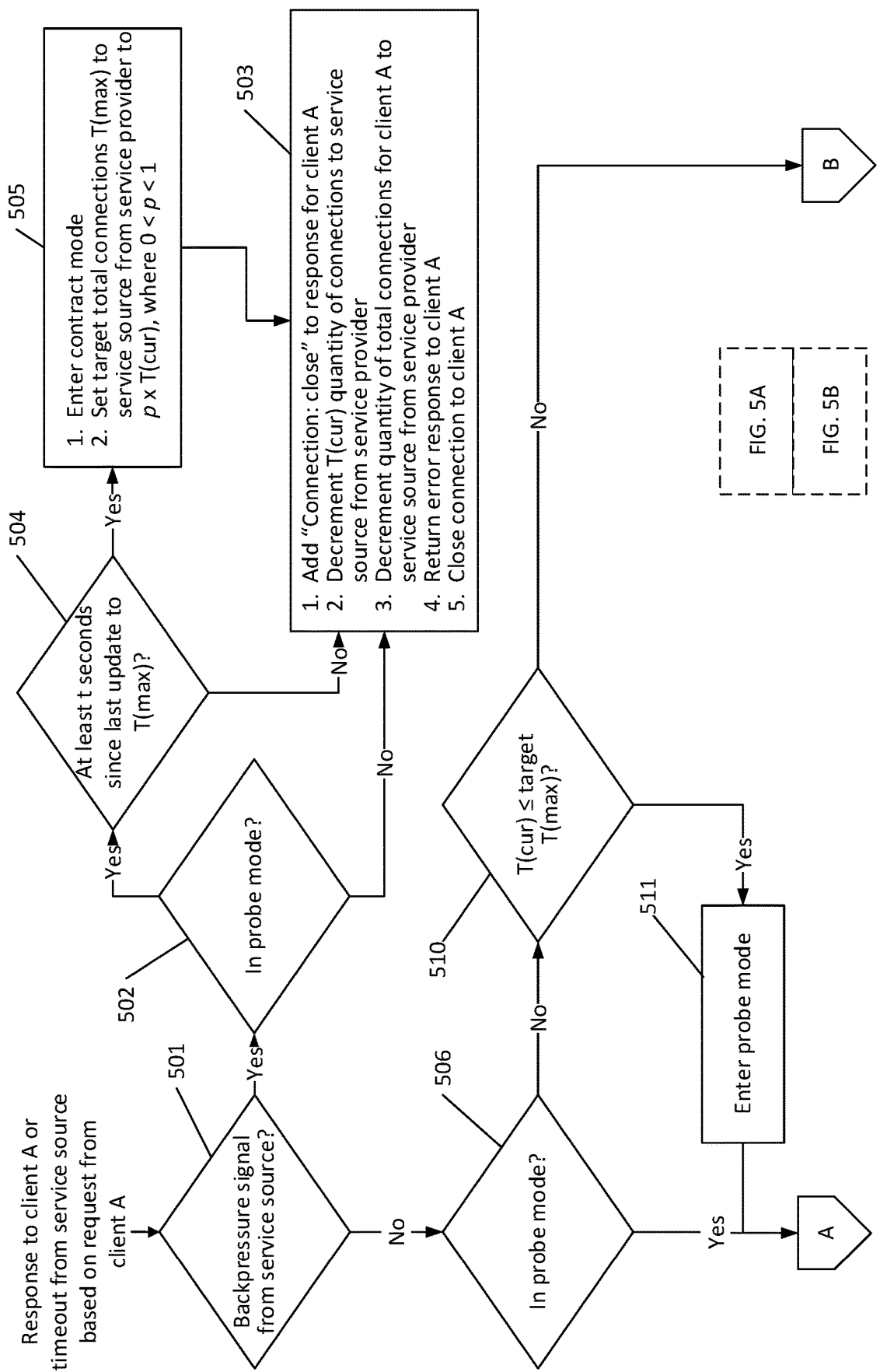
FIGS. 5A and 5B are flow charts showing examples of handling new connection requests from a client and adjusting modes of operation based on existing conditions.
Figure 5B:
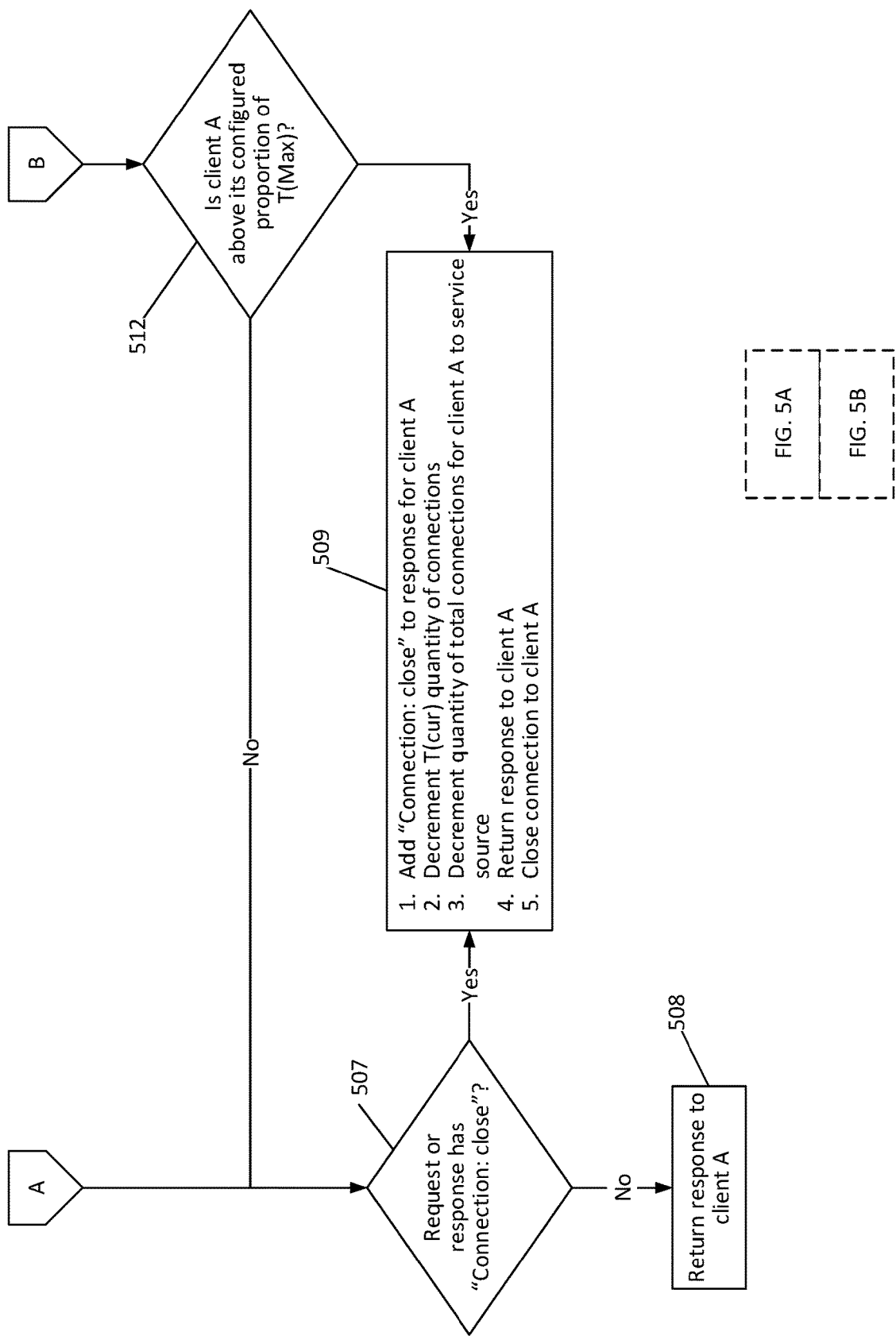

Methods such as those shown in FIGS. 4, 5A, and 5B may be implemented by one or more computing devices. The one or more computing devices may be selected from a service provider, a service source, a load balancer, a proxy, or a combination two or more of these computing devices. For purposes of explanation, FIGS. 4, 5A, and 5B are described from the perspective of a service provider.

Based on a new client connection request having been received, the service provider may determine (in step 401) whether the service provider is in the probe mode or another mode. Based on a determination that the service provider is in the probe mode, in step 402 the service provider may check whether the current quantity of connections T(cur) to the service source is greater than or equal to T(max)−1 (e.g., that the request for the new connection request from the client A would use the service source's last available unused connection or that the there are no unused connections). Based on a determination that more than one available connection may remain, in step 403 the service provider may determine whether the client A may be using less than a configured proportion of the total quantity of connections (e.g., less than a configured proportion of T(max)). Based on a determination that the client A may be using less than its configured proportion, in step 404 the service provider may perform operations comprising one or more of: allowing the connection to the service source, incrementing a quantity of the total connections T(cur) to the service source, or incrementing a quantity of a total quantity of connections by client A to the service source.

Based on a determination that the client A's request may be for the last available connection, in step 405 the service provider may check whether t seconds have elapsed since the last update to T(max). The value t may range from a fraction of a second to multiple seconds depending on one or more of: the quantity of available connections, the round trip time of a connection request being permitted by the service provider to the service source and a response, and/or other related factors.

Where t seconds have not elapsed since the last update to T(max), in step 403 the service provider may determine whether the client A may be using less than its configured proportion of T(max).

Based on a determination that t seconds or more have elapsed, in step 406 T(max) may be increased by a value (e.g., a value of 1). Other values may be used as based on the quantity of clients being serviced by the service provider. For example, where the service provider is servicing 1000 clients with 10,000 total target connections T(max), increasing by a value of 1 may not provide a desired growth rate to support the large quantity of clients. Instead, a value between 2-1000 may be used to adjust the growth rate of T(max). Further, the time t may be increased or decreased to comport with the quantity of clients, the quantity of connections, and/or a round trip time of communications from the service source to the service provider and back to the service provider. Where faster adding of new connections is desired, in step 406 T(max) may be increased by a value (e.g., a value of 1) based on the determination that the client A's request may be for the last available connection, and without regard to whether t seconds have elapsed (e.g., shown as a broken line connecting step 402 and step 406, skipping step 405). The service provider's checking (in step 405) whether t seconds have elapsed since the last update to T(max) may slow the increase of new connections. The service provider's checking (in step 405) may comprise the hold operation mode where connections are added more slowly than in the probe mode.

Based on a determination that the client A may be above its configured proportion of T(max), in step 407 the service provider may determine whether the current quantity of connections T(cur) to the service source from the service provider may be greater than or equal to T(max)−1. Based on a determination that the request would not take the last available connection, the service provider may permit the connection as described above in step 404.

Based on a determination that the request would take the last available connection or when there are no more available connections, in step 408 the service provider may refuse the connection and send a generic error message to the client. Additionally or alternatively, the service provider may send a specific error message to the client A as desired. Where only a generic error code is to be sent, in step 411 the service provider may disallow the connection request (e.g., shown as a broken line connecting step 407 and step 411, skipping step 408). In step 412, the service provider may send a generic HTTP 503 error code to the client A.

Where different types of error codes are to be sent, in step 408 the service provider may determine whether any client may be below its configured proportion of connections to the service source. Based on a determination that at least one client may be below its configured proportion of T(max), in step 409 the service provider may refuse the new connection request from client A. In step 410, the service provider may send an "HTTP 429" error code to the client A. The "HTTP 429" error code may indicate to client A that client A is sending too many requests. Where the client may be configured to handle "HTTP 429" error codes, the client A may temporarily reduce its quantity of connection requests to the service provider.

Based on a determination that no other client may be below its configured proportion of T(max), in step 411 the service provider may disallow the connection request. In step 412, the service provider may send an "HTTP 503" error code to the client A.

The "HTTP 503" error code may indicate that a service source is temporarily unavailable. A difference between the "HTTP 429" error code and the "HTTP 503" error code may include making clients who received the "HTTP 429" error code aware that they may be making too many requests and their requests may be limited. For those clients enabled to handle HTTP 429 requests, the clients may modify their quantity of concurrent service requests. The clients receiving the "HTTP 503" error code may be only made aware that the service source may be unavailable with no specific indication that their connection requests are too frequent.

Additionally or alternatively, steps 408-412 may be combined and the "HTTP 429 error code" and "HTTP 503 error code" replaced with a generic error code (or the HTTP 503 error code). This simplification may be useful where clients do not reduce their quantity of requests based on receiving the HTTP 429 error codes.

Table 1 below provides sample results based on existing conditions relating to a service provider implementing the process of FIG. 4. In the examples of Table 4, the initial quantity of concurrent connections allocated to a service source may be 20 concurrent connections. The client A's quota may be 5 concurrent connections to the service source and the client B's quota may be 15 concurrent connections to the service source. The quotas may be set (based on, e.g., preexisting agreements between users associated with one or more clients and one or more entities associated with one or more service providers) by the service provider, by the service source, and/or by one or more other computing devices. With only two clients, the resulting percentages of quota allocations may be 25% for the client A and 75% for the client B.

TABLE 1

| New Client Connection Request | Mode | Quantity A | Quantity B | T (cur) | T (max) |
|---|---|---|---|---|---|
| 1 | Probe | 4 | 14 | 18 | 20 |
| 2 | Probe | 4 | 15 | 19 | 20 |
| 3 | Probe | 4 | 15 | 19 | 20 |
| 4 | Contract | 4 | 16 | 20 | 20 |
| 5 | Contract | 6 | 12 | 18 | 20 |
| 6 | Contract | 6 | 14 | 20 | 20 |
| 7 | Contract | 6 | 16 | 22 | 20 |

| New Client Connection Request | Time since last T(max) update | Result | New Quantity A | New Quantity B | New T (cur) | New T (max) |
|---|---|---|---|---|---|---|
| 1 | NA | Allow | 5 | 14 | 19 | 20 |
| 2 | <t | Allow | 5 | 15 | 20 | 20 |
| 3 | >t | Allow | 5 | 15 | 20 | 21 |
| 4 | NA | Allow | 5 | 16 | 21 | 20 |
| 5 | NA | Allow | 7 | 12 | 19 | 20 |
| 6 | NA | Disallow (HTTP 429 error) | 6 | 14 | 20 | 20 |
| 7 | NA | Disallow (HTTP 503 error) | 6 | 16 | 22 | 20 |

New client connection request 1 (Example 1) of Table 1 may be the handling of a new connection request where all clients may be below their configured proportion of the total capacity and backpressure may not exist. In example 1, the service provider may be in the probe mode, the current quantity of connections T(cur) may be 18, the new connection request from the client A may not be for the last available unused connection, and the client A may be below its proportion of the target quantity of maximum connections T(max). The client A may be using 4 connections (e.g., less than 25% of 20 connections)—namely, less than 5 connections. The request for the new connection may be granted, the new quantity of A's connections may be increased to 5, and the current quantity of connections T(cur) to the service source may be increased from 18 to 19.

New client connection request 2 (Example 2) may be the handling of a new connection request similar to example 1 but where the request may be for the last available connection to the service source and may occur shortly after T(max) was recently updated. Example 2 shows how T(max) may be slowly increased so as to reduce the likelihood of an unstable situation where T(max) is adjusted too quickly before the service provider has determined that backpressure exists. In example 2, the current quantity of connections T(cur) may be 19, the client A may be requesting to use the last available connection, and the client A may be not using its proportion of T(max) (i.e., not using 25% of 20 connections). The client A may be only using 4 connections. The time since the last update may be less than t. The service provider may allow the request, increment quantity A and T(cur), but may not update T(max).

New client connection request 3 (Example 3) shows the controlled growth of T(max). The service provider may allow the request but, because the time since the last update to T(max) may be greater than t, the quantity of target max connections to the service source T(max) may be increased from 20 to 21. This allows the additive growth of the "additive increase/multiplicative decrease" approach where new connections may be slowly added (a new connection being added sequentially) while excessive connections may be quickly culled (multiple connections being culled together). Also, the service provider may increment and/or decrement the quantity A and the T(cur) as pertaining to the quantity of connections of the client A and the total quantity of connections T(cur) to the service source.

New client connection request 4 (Example 4) shows the handling of a new connection request in which the service provider may be operating in the contract mode while the client A may be consuming fewer than its proportion of connections. Example 4 differs from examples 1-3 as the service provider may be in the contract mode in example 4. The client A may be using less than its proportion of T(max) (e.g., the client A is using 4 connections, which is less than 25% of 20 connections). Because the client A may be using less than its proportion of T(max), the service provider may grant the connection request, increment the quantity of client's A's connections, and increase the total current quantity of connections T(cur) to 21 (which is larger than T(max) at 0). The total T(cur) may be permitted to increase above T(max) because the client A may be below its proportion of T(max) while other clients may be above their proportion of T(max) and the connections of those other clients may be expected to be culled first.

New client connection request 5 (Example 5) shows the handling of a new connection request in which the service provider may be operating in the contract mode and the client A may be consuming more connection resources above its configured proportion of T(max), while there are additional connections available. In example 5, the service provider may be in the contract mode, the client A may have 6 connections, the total quantity of connections T(cur) may be less than T(max) by 2 (18 and 20, respectively), and the client A may not be requesting the last available connection to the service source. The service provider may grant the request, increment the quantity of client A's connections to 7, and increase the total quantity of connection T(cur) to 19.

New client connection request 6 (Example 6) shows the service provider disallowing a new connection request where the service provider may be in the contract mode, and a client B may be below its configured capacity. The service provider may send an HTTP error instructing the client A to reduce its quantity of concurrent connections. Example 6 may be similar to example 5 but T(cur)≥T(max)−1 (e.g., 20≥19). Also, the client B may be using less than its proportion of T(max) (e.g., the client B may be using 14 connections, which is less than 15=75% of 20 connections). The service provider may disallow the connection request by the client A. The service provider may send the client A an HTTP 429 error code to alert the client A that the client A may be sending too many new connection requests. Where the client A may be configured to handle the HTTP 429 error code, the client A may respond to the HTTP 429 error code by reducing its rate of sending requests at least for a short interval of time (e.g., 5-30 seconds or any other back off period).

New client connection request 7 (Example 7) shows the service provider disallowing a new connection request where the service provider may be in the contract mode and no client may be below its configured capacity. The service provider may send an HTTP error code indicating that no capacity currently exists. Example 7 may be similar to the example 6 but each of the client A and the client B may be above its proportion of T(max) (the client A's quantity=6, which is greater than 25% of 20, and the client B's quantity=16, which is greater than 75% of 20). The service provider may disallow the connection request by the client A and may send an HTTP 503 error code to the client A to alert the client A that no connections are available. The sending of the HTTP 503 error code instead of the HTTP 429 error code may treat the client A the same as the other client or clients by alerting client A that no connections are available, in contrast to alerting client A to reduce its rate of sending new connection requests. The alerting may be based on the service provider sending HTTP 429 error code).

FIGS. 5A and 5B are flow charts showing examples of methods for handling new connection requests from a client and adjusting modes of operation based on existing conditions.

Based on a service source having either responded to a client request or failed to respond to the client request within time t, in step 501 a service provider may determine whether backpressure exists from the service source. How the service provider responds may be based on one or more of: the existence of backpressure, the current operation mode of the service provider, the requesting client exceeding its quota and/or proportion of excess capacity, and any clients exceeding their quota and/or proportion of their excess capacity.

In step 501, the service provider may determine whether backpressure exists from the service source. The backpressure may comprise one or more of: an explicit denial of connection requests, a service source not responding to connection requests within time t, or from a service provider monitoring a ratio of connection requests to the connections being accepted by the service source.

Based on a determination that backpressure exists, in step 502 the service provider may determine whether the service provider is in the probe mode. Based on a determination that the service provider is not in the probe mode, in step 503 the service provider may perform one or more of: adding a "Connection: close" annotation to a message to be sent to the client A, decrementing the total connections T(cur) to the service source (T(cur)=T(cur)−1), decrementing a quantity A of connections to the service source (quantity A=quantity A−1), sending an error message to the client A (e.g., an "HTTP 429" error code or an "HTTP 503" error code), or closing the connection to the client A.

Based on a determination that the service provider is in the probe mode, in step 504 the service provider may determine whether t seconds have elapsed since the last update to T(max). Based on a determination that t seconds have not elapsed, the service provider may close the connection to client A using one or more operations associated with step 503. Based on a determination that t seconds have elapsed, in step 505 the service provider may perform one or more of: entering the contract mode or setting the target total connections T(max) to T(cur)*p, where 0<p<1. The service provider may close the client connection using one or more operations associated with step 503.

By setting T(max) to T(cur)*p and not to an arbitrary amount, the service provider and possibly other service providers also providing access to the service source may be able to cooperate although not explicitly coordinating with each other. This setting T(max) to T(cur)*p may promote that each service provider (e.g., a proxy to the service source) receives a fair share of the total capacity of the service source. Also, the decrease may back off the quantity of connections at least as fast as the additive increase/multiplicative decrease approach (AIMD). Additionally or alternatively, T(max) may be set to an even faster back off methodology (e.g., as a square root of T(cur) (e.g., SQRT (T(cur))) to more quickly reduce connections.

Based on a determination that no backpressure exists, in step 506 the service provider may determine the current mode. Based on a determination that the service provider is operating in the probe mode, in step 507 (FIG. 5B) the service provider may determine whether a request from the client A or a response from the service source comprises an instruction to close the connection (e.g., an HTTP/1.1 "connection: close" in the header of a message). Based on a determination that no "connection: close" annotation was associated with the message and that the message was from the service source for a particular connection with the client A, in step 508 the service provider may send the message to the client A. Based on a determination that a "connection: close" annotation is associated with the message from the client or the message from the service source, in step 509 the service provider may perform one or more of: adding a "Connection: close" to an annotation of a message to be sent to the client A, decrementing the total connections T(cur) to the service source (T(cur)=T(cur)−1), decrementing a quantity A of connections to the service source (quantity A=quantity A−1), sending the message to the client A, or closing the connection to the client A.

Based on a determination that the service provider is not in the probe mode, in step 510 the service provider may change the mode to the probe mode. The service provider may determine whether a request from the client A or a response from the service source comprises an instruction to close the connection (e.g., an HTTP/1.1 "connection: close" in the header of one of the messages) and continues with step 507 described above.

Based on a determination that the total connections T(cur) is greater than the target quantity of connections T(max), in step 512 the service provider may determine whether the client A may be above its proportion of the target quantity of maximum connections T(max) to the service source. Based on a determination that client A is not proportionally above the target quantity of connections T(Max), in step 507 the service provider may determine whether a message from the client A or a message from the service source for the client A includes an instruction to close the connection as described above.

Based on a determination that the client A is proportionally above the target quantity of connections T(max), the service provider may perform one or more of the operations of step 509 described above.

Table 2 below provides sample results based on existing conditions relating to the process of FIGS. 5A and 5B. In the sample results, either a message has been received or a timeout has occurred. The message may be a standard messaging response including or not including content from either the client A or from the service source.

The initial quantity of concurrent connections allocated to a service source may be 20 concurrent connections. The client A's quota may be set to 5 concurrent connections to the service source and the client B's quota may be set to 15 concurrent connections to the service source. The quotas may be set (based on, e.g., preexisting agreements between users associated with one or more clients and one or more entities associated with one or more service providers) by the service provider, by the service source, and/or by one or more other computing devices. With only two clients, the resulting percentages of quota allocations may be 25% for the client A and 75% for the client B. Also, the value p of step 505 of FIG. 5A may be set to 0.75.

TABLE 2

| Response or timeout | Backpressure | Mode | Quantity A | Quantity B | T (cur) | T (max) | Time t since last T (max) update |
|---|---|---|---|---|---|---|---|
| I | Yes | Contract | 4 | 14 | 18 | 20 | NA |
| II | Yes | Probe | 4 | 14 | 18 | 20 | <t |
| III | Yes | Probe | 4 | 14 | 18 | 20 | >t |
| IV | No | Probe | 4 | 14 | 18 | 20 | NA |
| V | No | Probe | 4 | 14 | 18 | 20 | NA |
| VI | No | Contract | 5 | 14 | 19 | 20 | NA |
| VII | No | Contract | 5 | 14 | 19 | 20 | NA |
| VIII | No | Contract | 4 | 16 | 20 | 19 | NA |
| IX | No | Contract | 4 | 16 | 20 | 19 | NA |
| X | No | Contract | 6 | 14 | 20 | 19 | NA |

TABLE 2-continued

| Response or timeout | New Mode | Service source response or client A request includes "connection: close" header? | Response returned | New Quantity A | New Quantity B | New T (cur) | New T (max) |
|---|---|---|---|---|---|---|---|
| I | Same | NA | With Close | 3 | 14 | 17 | 20 |
| II | Same | NA | With Close | 3 | 14 | 17 | 20 |
| III | Contract | NA | With Close | 3 | 14 | 17 | 14 |
| IV | Same | No | Response only | 4 | 14 | 18 | 20 |
| V | Same | Yes | With Close | 3 | 14 | 17 | 20 |
| VI | Probe | No | Response only | 5 | 14 | 19 | 20 |
| VII | Probe | Yes | With Close | 4 | 14 | 18 | 20 |
| VIII | Same | No | Response only | 4 | 16 | 20 | 19 |
| IX | Same | Yes | With close | 3 | 16 | 19 | 19 |
| X | Same | NA | With close | 5 | 14 | 19 | 19 |

Example I shows how a message may be handled in the contract mode based on a determination that backpressure exists. In example I, backpressure may have been detected from the service source and the service provider may be in the contract mode. Quantity A=4 and Quantity B=14. T(cur)=18 and T(max)=20. Because backpressure has been detected in the contract mode, service provider may begin culling connections. The service provider may perform one or more of: adding a "connection: close" header to a message for the client A, decrementing the quantity of the client A to 3, or decrementing the total quantity of connections T(cur) to 17. The target quantity of max connections T(max) may remain unchanged at 20.

Example II shows how a response is handled in the probe mode based on a determination that backpressure exists and where T(max) has been recently updated. T(max) may not be updated in this example II to minimize the likelihood of an unstable state existing. This unstable state may occur where the service provider adjusts T(max) too frequently. The frequent adjustments of T(max) may result in significant quantities of connections to be closed unnecessarily. In example II, backpressure has been detected from the service source and the service provider may be in the probe mode. Quantity A=4 and Quantity B=14. T(cur)=18 and T(max)= 20. Less than t seconds may have elapsed since the last update to T(max). Because backpressure may have been detected in the probe mode but less than t seconds have elapsed, the service provider may not change mode and T(max) may not be modified. However, in step 503 the service provider begins culling connections. The service provider may perform one or more of: adding a "connection: close" header to the response for the client A, decrementing the quantity of the client A to 3, or decrementing the total quantity of connections T(cur) to 17.

Example III shows how a response may be handled in the probe mode based on the service provider determining that backpressure exists and where the response has been received some time after T(max) has been updated. Here, the target quantity of max connections may be adjusted to be a portion of the current quantity of connections and the service provider may change modes to the contract mode. Example III may be an example of the multiplicative decrease of the quantity of connections but only after some time interval since the last update to the target quantity of total connections. Quantity A=4 and Quantity B=14. T(cur)=18 and T(max)=20. In contrast to example II, more than t seconds may have elapsed since the last update to T(max). Referring to FIG. 5A, in step 505 the service provider may enter the contract mode and may reduce the target quantity of max connections T(max) to a fraction of the current connections T(cur) by multiplying T(cur) by p, where 0<p<1. T(max) may have been reduced to 14 (=0.75*18). This change in T(max) may be an example of the multiplicative decrease of the AIMD (additive increase/multiplicative decrease) approach to managing connections. In step 503, the connection related to the response may be closed and other operations, where desired, may be performed to close the connection.

Example IV shows how a response from the service source may be handled by the service provider in the probe mode and where no backpressure has been determined to exist. In example IV, no backpressure has been detected from the service source, the service provider may be in the probe mode, and no "connection: close" has been received from the client or the service source. Quantity A=4 and Quantity B=14. T(cur)=18 and T(max)=20. Based on no backpressure having been detected, the mode may not change (i.e., remains as the probe mode). The service provider may forward the response to the client A.

Example V shows how a response may be handled while the service provider is in the probe mode and no backpressure has been determined to exist but either the client or service source may have requested the connection be closed (e.g., through a "connection: close" instruction being present in a message header in accordance with HTTP 1.1). Based on the existence of the "connection: close" command, the service provider may perform one or more of: sending a message to the client regarding the closure, closing the connection, decrementing the quantity of the client A's connections to 3, and decrementing the total current connections T(cur) to 17.

Example VI shows how a service provider may handle a service source's message based on the service provider being in the contract mode and the connection quantities allowing the service provider to shift into the probe mode. In example VI, the service provider may be in the contract mode, no backpressure has been detected, quantity A=5, quantity B=14, T(cur)=19, and T(max)=20. Because the total connections T(cur) (19) may be less than the target maximum quantity of connections T(max) (20) and no "connection: close" instruction has been received, the service provider may shift to the probe mode and may forward the message to the client.

Example VII shows how a service provider may handle a message based on the service provider being in the contract mode, the connection quantities allowing the service provider to shift into the probe mode, and a client or the service source may have requested the connection be closed. Example VII may be similar to that of example VI but also comprises a "connection: close" instruction in a received message. The service provider may switch to the probe mode. Based on the "connection: close" annotation, the service provider may send a message to the client with a "connection: close" instruction, the service provider may close the connection, the service provider may decrement the quantity of the client A's connections to 4, and service provider may decrement the total current connections T(cur) to 18.

Example VIII shows how a service provider may permit a message from the service source to be sent to the client A without closing the connection while in the contract mode based on the client being under its proportion of the target capacity. In example VIII, the service provider may be in the contract mode, no backpressure has been detected, quantity A=4, quantity B=16, T(cur)=20, and T(max)=19. Because the total connections T(cur) (20) may be more than the target maximum quantity of connections T(max) (19) and no "connection: close" instruction has been received, the service provider may keep the mode as the contract mode and may forward the message from the service source to the client.

Example IX shows how a service provider may permit a message from the service source to be sent to the client A and closing the connection based on at least one of the client A or the service source requesting the connection be closed. In example IX, the service provider may be in the contract mode, no backpressure has been detected, quantity A=4, quantity B=16, T(cur)=20, T(max)=19, and a "connection: close" instruction may have been received. The client A is not proportionally above its proportion of the target capacity. The service provider may send a message to the client A with a "connection: close" command. The service provider may decrement the quantity of the client A's connections to 3 and may decrement the quantity of current connections T(cur) to 19.

Example X shows how a service provider may close a client's connection that has exceeded the client's target capacity while the service provider is in the contract mode. The service provider may send a message to the client A with an annotation in the message that the connection is being closed. In example X, the service provider may be in the contract mode, no backpressure has been detected, quantity A=6, quantity B=14, T(cur)=20, T(max)=19, and no "connection: close" instruction has been received. The client A may be proportionally above its portion of the target capacity (6>4.75 (=25% of 19)). The service provider may send a message to client A with a "connection: close" command. The service provider may decrement the quantity of the client A's connections to 3 and may decrement the quantity of current connections T(cur) to 19.

Figure 6:
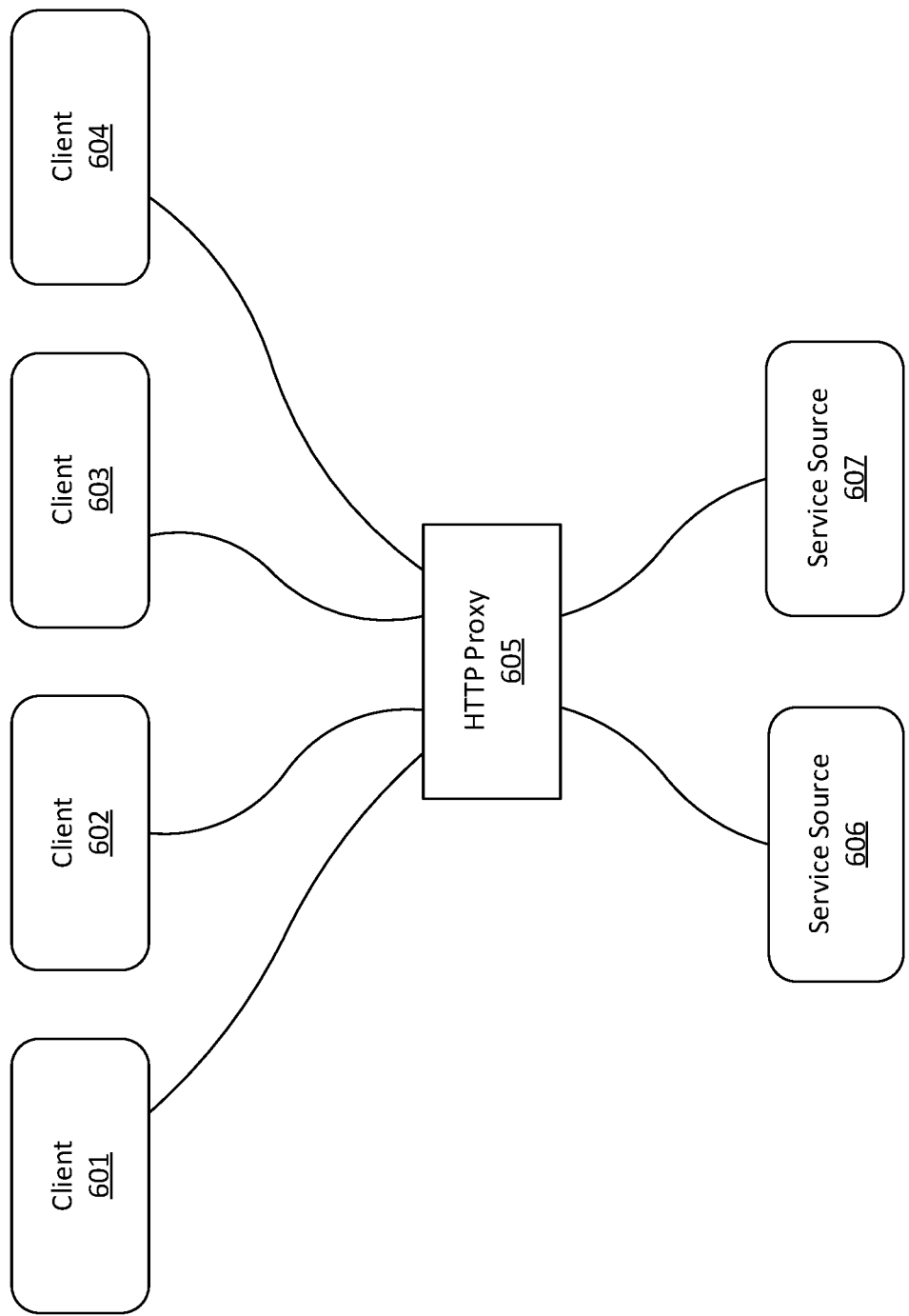
FIGS. 6-7 show examples of connections between clients and services.
Figure 7:
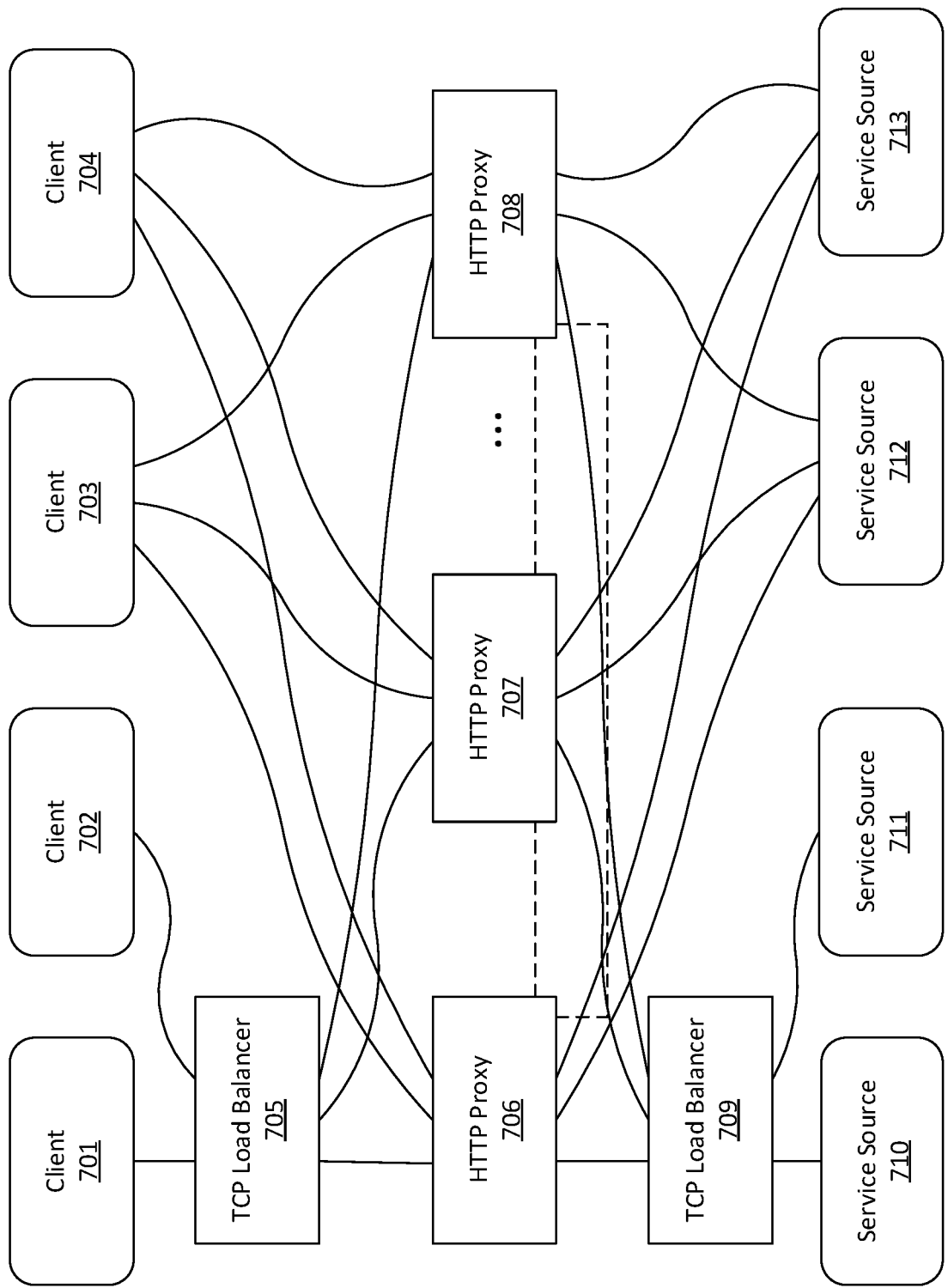

FIGS. 6-7 show examples of connections between clients and service sources with interstitial load balancers and proxies.

FIG. 6 shows an example of a client 601, a client 602, a client 603 and a client 604. These clients may be considered separate clients with each having its own quota and allotment of excess capacity. Additionally or alternatively, the client 601 and the client 602 may share a single quota for the combination of these two clients (e.g., a quota for a first group comprising the client 601 and the client 602) and the client 603 and the client 603 may share a single quota for the combination of these two clients (e.g., a quota for a second group comprising the client 603 and the client 604).

One or more of the service sources 606 or 607 may monitor the various quotas, the allotted excess capacities for clients, quantities of total connections, and target quantity of connections via one or more of the following: each service source monitors its own quotas, allotted excess values, quantities of current connections, and target quantity of connections for each of the clients 601, 602, 603 and 604; each service source keeps a first set of the combined quotas, allotted excess values, quantities of current connections, and target quantity of connections for the clients 601 and 602 and each keeps a second set of combined quotas, allotted excess values, quantities of current connections, and target quantity of connections for the client 603 and client 604; or together the service sources 606 and 606 may keep a shared third combined set of quotas, allotted excess values, quantities of current connections, and target quantity of connections for the clients 601 and 602 and together the service sources 606 and 606 may keep a shared fourth combined set of quotas, allotted excess values, quantities of current connections, and target quantity of connections for the clients 603 and 604.

The clients 601, 602, 603 and 604 may be connected to the service sources 606 and 607 through direct identification of the service sources 606 and 607 via their IP addresses. Additionally or alternatively, the clients 601, 602, 603 and 604 may be connected through an HTTP proxy 605. The HTTP proxy 605 may be considered a service provider for the above descriptions relating to managing connections to the service sources 606 and 607.

The checking and updating of the various quotas, allotted excess values, quantities of connections, and target quantity of connections may be solely assigned, updated, incremented, and decremented in the computer systems of the service sources (e.g., the service source 606 and the service source 607). Additionally or alternatively, some or all of these items may be assigned, updated, incremented, and decremented in the HTTP proxy 605 or in alternate entities as identified in FIG. 1.

FIG. 7 shows an example of an architecture using the capacity management system. Other architectures may be used. FIG. 7 comprises clients (e.g., a client 701, a client 702, a client 703, and a client 704), TCP load balancers (e.g., a TCP load balancer 705 and a TCP load balancer 709), HTTP proxies (an HTTP proxy 706, an HTTP proxy 707, and an HTTP proxy 708), and service sources (a service source 710, a service source 711, a service source 712, and a service source 71). One or more of the entities between the clients 701-704 and the service sources 710-713 may be considered to be the service providers (e.g., the service provider 308 of FIG. 3). Additionally or alternatively, the service providers may be combined with the service sources 710-713. These clients, TCP load balances, HTTP proxies, and service sources may be connected by one or more multiple communication links.

One or more of the client 701 or the client 702 may send their connection requests through the TCP load balancer 705, which may send the connection requests to one or more of the HTTP proxies 706, 707, and 708. The connection requests from the client 703 and the client 704 may not be sent through a load balancer but may be sent directly to the HTTP proxies (e.g., the HTTP proxy 706, the HTTP proxy 707, and/or the HTTP proxy 708).

The connection requests for the service source 710 and the service source 711 may be balanced by the TCP load balancer 709. The service requests for the service source 712 and the service source 713 may not be not balanced by a load balancer but may be sent directly to the service sources 712-713 from the HTTP Proxies 706, 707, and 708.

The checking and updating of the various quotas, allotted excess values, quantities of connections, and target quantity of connections for the service sources 710 and 711 may be managed in their respective service providers (whether or not contained or separate from the HTTP proxies 706-708) or in the TCP load balancer 709. For the TCP load balancer 709 to manage the connection requests for the service sources 710 and 711, the various quotas, allotted excess values, quantities of current connections, and target quantity of connections, the information comprising the quotas, total capacity, and targets may originate with the service source 710 and the service source 711 and be sent to the TCP load balancer 709. Additionally or alternatively, this information may originate and be managed in the TCP load balancer 709.

Further, the HTTP proxies 706-708 may also manage the information for the service sources to which they connect. In contrast to the service sources 710 and 711 that are solely accessed through the TCP load balancer 709, the service sources 712 and 713 may be independently accessed through each of the HTTP proxy 706, the HTTP proxy 707, and the HTTP proxy 708. The information comprising the quotas, total capacity, and targets may be managed in various ones of the service source 710, the service source 711, the service source 712, and the service source 713 and that information sent to the HTTP proxies 706-708 to manage at least one of updating the quantities, allotting portions of excess capacity, monitoring the total quantity of connections, and monitoring the target quantity of connections stored in the HTTP proxies 706-708. Also, where the HTTP proxies 706-708 may permit a new connection from a client, that HTTP proxy may send a message to at least one of the service source and the other HTTP proxies to update the records regarding the quantity for that client to a specific service source and the quantity of the total quantity of connections to that specific service source. Optional connections are shown in broken lines between the various HTTP proxies 706-708.

Various concepts have been described using examples. The disclosure is not limited to these examples. Modifications may be made, particularly in light of the foregoing teachings. Each of the features of the aforementioned examples may be utilized alone or in combination or sub-combination with features of the other examples. Any of the above described systems and methods or parts thereof may be combined with the other methods and systems or parts thereof described above. Steps shown in the example figures may be performed in other than the recited order, one or more steps may be omitted, and/or one or more other steps may be added. It will also be appreciated and understood that modifications may be made without departing from the true spirit and scope of the present disclosure. The description is thus to be regarded as illustrative instead of restrictive on the present disclosure.

It is noted that various connections are set forth between elements in the following description. These connections are described in general and, unless specified otherwise, may be direct or indirect; this specification is not intended to be limiting in this respect.

What is claimed is:

1. A method comprising:
   receiving, from a device associated with a user, a request for a new connection associated with a service;
   determining a total quantity of current connections associated with the service;
   determining, for the user, a user quantity of current connections associated with the service;
   based on the total quantity of current connections being less than a total connection threshold associated with the service and based on the user quantity of current connections being greater than or equal to a user connection threshold, allowing the new connection; and
   after allowing the new connection, based on an updated total quantity of current connections associated with the service being greater than or equal to the total connection threshold, and based on an updated user quantity of current connections being greater than the user connection threshold, causing disconnection of at least one current connection, of the user, associated with the service and maintaining at least a second current connection, of the user, associated with the service.

2. The method of claim 1, further comprising:
   incrementing, based on the allowing the new connection, the total quantity of current connections.

3. The method of claim 1, further comprising:
   based on one or more computing devices, associated with the service, being in an operation mode associated with an absence of backpressure and based on time elapsed since an update of the total connection threshold, incrementing, the total connection threshold.

4. The method of claim 1, further comprising:
   based on one or more computing devices, associated with the service, being in an operation mode associated with an absence of backpressure and based on an updated total quantity of current connections being greater than or equal to the total connection threshold, incrementing the total connection threshold.

5. The method of claim 1, further comprising:
   based on a message, indicating a lack of backpressure, from one or more computing devices associated with the service, changing to a no backpressure operation mode,
   wherein the causing disconnection is further based on the no backpressure operation mode.

6. The method of claim 1, further comprising:
   based on a message, indicating a presence of backpressure, from one or more computing devices associated with the service, changing to a backpressure operation mode,
   wherein the causing disconnection is further based on the backpressure operation mode.

7. The method of claim 1, further comprising:
   causing, based on the allowing the new connection, the user to receive, via the new connection, content from the service.

8. The method of claim 1, further comprising:
based on a presence of backpressure and based on a time since a previous change in the total connection threshold being less than a time threshold, decrementing the total connection threshold.

9. The method of claim 1, further comprising:
based on an existence of backpressure and based on a time since a previous change in the total connection threshold being greater than or equal to a time threshold, cause disconnection of at least the second current connection, of the user, associated with the service.

10. The method of claim 1, further comprising:
based on an existence of backpressure, cause disconnection of at least a third connection, of a second user, associated with the service.

11. A system comprising:
a first computing device, wherein the first computing device is configured to:
receive, from a second computing device associated with a user, a request for a new connection to a service;
determine a total quantity of current connections associated with the service;
determine, for the user, a user quantity of current connections associated with the service;
based on the total quantity of current connections being less than a total connection threshold associated with the service and based on the user quantity of current connections being greater than or equal to a user connection threshold, allow the new connection; and
after allowing the new connection, based on an updated total quantity of current connections associated with the service being greater than or equal to the total connection threshold, and based on an updated user quantity of current connections being greater than the user connection threshold, cause disconnection of at least one current connection, of the user, associated with the service and maintain at least a second current connection, of the user, associated with the service; and
the second computing device, associated with the user, configured to send the request for the new connection.

12. The system of claim 11, wherein the first computing device is further configured to:
based on an absence of backpressure and based on a time since a previous change in the total connection threshold being greater than or equal to a time threshold, increment the total connection threshold.

13. The system of claim 11, wherein the first computing device is further configured to:
based on a presence of backpressure and based on a time since a previous change in the total connection threshold being less than a time threshold, decrement the total connection threshold.

14. The system of claim 11, wherein the first computing device is further configured to:
based on an existence of backpressure and based on a time since a previous change in the total connection threshold being greater than or equal to a time threshold, cause disconnection of at least the second current connection, of the user, associated with the service.

15. The system of claim 11, further comprising:
a third computing device, associated with a second user and connected, via a third current connection, to the service,
wherein the first computing device is further configured to:
based on an existence of backpressure, cause disconnection of at least the second third current connection, of the second user, associated with the service.

16. The system of claim 11, wherein the first computing device is further configured to:
cause, based on the allowance of the new connection, the user to receive, via the new connection, content from the service.

17. The system of claim 11, wherein the first computing device is further configured to:
based on one or more computing devices, associated with the service, being in an operation mode associated with an absence of backpressure and based on an updated total quantity of current connections being greater than or equal to the total connection threshold, increment the total connection threshold.

18. The system of claim 11, wherein the first computing device is further configured to:
based on a message, indicating a lack of backpressure, from one or more computing devices associated with the service, change to a no backpressure operation mode, and
cause the disconnection further based on the no backpressure operation mode.

19. The system of claim 11, wherein the first computing device is further configured to:
based on a message, indicating a presence of backpressure, from one or more computing devices associated with the service, change to a backpressure operation mode, and
cause the disconnection further based on the backpressure operation mode.

20. A method comprising:
receiving, from a device associated with a first user, a request for a new connection associated with a service;
determining a total quantity of current connections associated with the service;
determining, for the first user, a first user quantity of current connections associated with the service;
based on the total quantity of current connections associated with the service being greater than or equal to a total connection threshold and based on the first user quantity of current connections being greater than or equal to a first user connection threshold, disallowing the new connection; and
sending, based on a comparison of a quantity of current connections, of at least one other user, and a connection threshold associated with the at least one other user, one of a plurality of messages indicating the disallowed new connection.

21. The method of claim 20,
wherein the disallowing the new connection is further based on the quantity of current connections of the at least one other user being less than the connection threshold associated with the at least one other user and based on the first user quantity of current connections being greater than or equal to the first user connection threshold.

22. The method of claim 20,
wherein the disallowing the new connection is further based on the quantity of current connections of the at least one other user being greater than or equal to the connection threshold associated with the at least one other user and based on the first user quantity of current connections being greater than or equal to the first user connection threshold.

23. The method of claim 20, further comprising:
based on one or more computing devices, associated with the service, being in an operation mode that is associated with an absence of backpressure and a time since an update of the total connection threshold, incrementing the total connection threshold.

24. The method of claim 20, further comprising:
based on one or more computing devices, associated with the service, being in an operation mode associated with an absence of backpressure, based on the disallowing the new connection, and based on an updated total quantity of current connections being greater than or equal to the total connection threshold, incrementing the total connection threshold.

25. The method of claim 20, further comprising:
based on a message, indicating a lack of backpressure, from one or more computing devices associated with the service, changing to a no backpressure operation mode,
wherein the disallowing the new connection is further based on the no backpressure operation mode.

26. The method of claim 20, further comprising:
based on a message, indicating a presence of backpressure, from one or more computing devices associated with the service, changing to a backpressure operation mode,
wherein the disallowing the new connection is further based on the backpressure operation mode.

27. An apparatus comprising:
one or more processors; and
memory storing instructions that, when executed by the one or more processors, cause the apparatus to:
  receive, from a device associated with a first user, a request for a new connection associated with a service;
  determine a total quantity of current connections associated with the service;
  determine, for the first user, a first user quantity of current connections associated with the service;
  based on the total quantity of current connections associated with the service being greater than or equal to a total connection threshold and based on the first user quantity of current connections being greater than or equal to a first user connection threshold, disallow the new connection; and
  send, based on a comparison of a quantity of current connections, of at least one other user, and a connection threshold associated with the at least one other user, one of a plurality of messages indicating the disallowed new connection.

28. The apparatus of claim 27, wherein the instructions further cause the apparatus to:
disallow the new connection further based on the quantity of current connections of the at least one other user being less than the connection threshold associated with the at least one other user and based on the first user quantity of current connections being greater than or equal to the first user connection threshold.

29. The apparatus of claim 27, wherein the instructions further cause the apparatus to:
disallow the new connection further based on the quantity of current connections of the at least one other user being greater than or equal to the connection threshold associated with the at least one other user and based on the first user quantity of current connections being greater than or equal to the first user connection threshold.

30. The apparatus of claim 27, wherein the instructions further cause the apparatus to:
based on one or more computing devices, associated with the service, being in an operation mode that is associated with an absence of backpressure and a time since an update of the total connection threshold, increment the total connection threshold.

31. The apparatus of claim 27, wherein the instructions further cause the apparatus to:
based on one or more computing devices, associated with the service, being in an operation mode associated with an absence of backpressure, based on the disallowance of the new connection, and based on an updated total quantity of current connections being greater than or equal to the total connection threshold, increment the total connection threshold.

32. The apparatus of claim 27, wherein the instructions further cause the apparatus to:
based on a message, indicating a lack of backpressure, from one or more computing devices associated with the service, change to a no backpressure operation mode, and
disallow the new connection further based on the no backpressure operation mode.

33. The apparatus of claim 27, wherein the instructions further cause the apparatus to:
based on a message, indicating a presence of backpressure, from one or more computing devices associated with the service, change to a backpressure operation mode, and
disallow the new connection further based on the backpressure operation mode.

34. A system comprising:
a first computing device, wherein the first computing device is configured to:
  receive, from a second computing device associated with a first user, a request for a new connection associated with a service;
  determine a total quantity of current connections associated with the service;
  determine, for the first user, a first user quantity of current connections associated with the service;
  based on the total quantity of current connections associated with the service being greater than or equal to a total connection threshold and based on the first user quantity of current connections being greater than or equal to a first user connection threshold, disallow the new connection; and
  send, based on a comparison of a quantity of current connections, of at least one other user, and a connection threshold associated with the at least one other user, one of a plurality of messages indicating the disallowance of the new connection; and
the second computing device, associated with the first user, configured to send the request for the new connection.

35. The system of claim 34, wherein the first computing device is further configured to:
disallow the new connection further based on the quantity of current connections of the at least one other user being less than the connection threshold associated with the at least one other user and based on the first user quantity of current connections being greater than or equal to the first user connection threshold.

36. The system of claim 34, wherein the first computing device is further configured to:
disallow the new connection further based on the quantity of current connections of the at least one other user being greater than or equal to the connection threshold associated with the at least one other user and based on the first user quantity of current connections being greater than or equal to the first user connection threshold.

37. The system of claim 34, wherein the first computing device is further configured to:
based on one or more computing devices, associated with the service, being in an operation mode that is associated with an absence of backpressure and a time since an update of the total connection threshold, increment the total connection threshold.

38. The system of claim 34, wherein the first computing device is further configured to:
based on one or more computing devices, associated with the service, being in an operation mode associated with an absence of backpressure, based on the disallowance of the new connection, and based on an updated total quantity of current connections being greater than or equal to the total connection threshold, increment the total connection threshold.

39. The system of claim 34, wherein the first computing device is further configured to:
based on a message, indicating a lack of backpressure, from one or more computing devices associated with the service, change to a no backpressure operation mode, and
disallow the new connection further based on the no backpressure operation mode.

40. The system of claim 34, wherein the first computing device is further configured to:
based on a message, indicating a presence of backpressure, from one or more computing devices associated with the service, change to a backpressure operation mode, and
disallow the new connection further based on the backpressure operation mode.

41. An apparatus comprising:
one or more processors; and
memory storing instructions that, when executed by the one or more processors, cause the apparatus to:
receive, from a computing device associated with a user, a request for a new connection to a service;
determine a total quantity of current connections associated with the service;
determine, for the user, a user quantity of current connections associated with the service;
based on the total quantity of current connections being less than a total connection threshold associated with the service and based on the user quantity of current connections being greater than or equal to a user connection threshold, allow the new connection; and
after allowing the new connection, based on an updated total quantity of current connections associated with the service being greater than or equal to the total connection threshold, and based on an updated user quantity of current connections being greater than the user connection threshold, cause disconnection of at least one current connection, of the user, associated with the service and maintain at least a second current connection, of the user, associated with the service.

42. The apparatus of claim 41, wherein the instructions further cause the apparatus to:
based on an absence of backpressure and based on a time since a previous change in the total connection threshold being greater than or equal to a time threshold, increment the total connection threshold.

43. The apparatus of claim 41, wherein the instructions further cause the apparatus to:
based on one or more computing devices, associated with the service, being in an operation mode associated with an absence of backpressure and based on an updated total quantity of current connections being greater than or equal to the total connection threshold, increment the total connection threshold.

44. The apparatus of claim 41, wherein the instructions further cause the apparatus to:
based on a presence of backpressure and based on a time since a previous change in the total connection threshold being less than a time threshold, decrement the total connection threshold.

45. The apparatus of claim 41, wherein the instructions further cause the apparatus to:
based on a message, indicating a lack of backpressure, from one or more computing devices associated with the service, change to a no backpressure operation mode, and
cause the disconnection further based on the no backpressure operation mode.

46. The apparatus of claim 41, wherein the instructions further cause the apparatus to:
based on a message, indicating a presence of backpressure, from one or more computing devices associated with the service, change to a backpressure operation mode, and
cause the disconnection further based on the backpressure operation mode.

47. The apparatus of claim 41, wherein the instructions further cause the apparatus to:
based on an existence of backpressure and based on a time since a previous change in the total connection threshold being greater than or equal to a time threshold, cause disconnection of at least the second current connection, of the user, associated with the service.

48. The apparatus of claim 41, wherein the instructions further cause the apparatus to:
based on an existence of backpressure, cause disconnection of at least a third current connection, of a second user, associated with the service.

49. The apparatus of claim 41, wherein the instructions further cause the apparatus to:
cause, based on the allowance of the new connection, the user to receive, via the new connection, content from the service.

* * * * *

UNITED STATES PATENT AND TRADEMARK OFFICE
CERTIFICATE OF CORRECTION

PATENT NO. : 11,128,525 B2
APPLICATION NO. : 16/145915
DATED : September 21, 2021
INVENTOR(S) : Moore et al.

It is certified that error appears in the above-identified patent and that said Letters Patent is hereby corrected as shown below:

In the Specification

Column 13, Detailed Description, Line 59:
Delete "0)." and insert --20).-- therefor Column 20, Detailed Description, Line 29:
Delete "606 and 606" and insert --606 and 607-- therefor Column 20, Detailed Description, Line 33:
Delete "606 and 606" and insert --606 and 607-- therefor Column 20, Detailed Description, Line 62:
Delete "71)." and insert --713).-- therefor In the Claims Column 22, Line 42:
In Claim 3, delete "incrementing," and insert --incrementing-- therefor Column 23, Line 66:
In Claim 15, after "at least the", delete "second"

Signed and Sealed this
Second Day of May, 2023

Katherine Kelly Vidal
*Director of the United States Patent and Trademark Office*